United States Patent
Raju

(10) Patent No.: US 11,704,446 B2
(45) Date of Patent: *Jul. 18, 2023

(54) THEFT DETECTOR

(71) Applicant: TEXAS INSTRUMENTS INCORPORATED, Dallas, TX (US)

(72) Inventor: Veeramanikandan Raju, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 186 days.

This patent is subject to a terminal disclaimer.

(21) Appl. No.: 16/865,067

(22) Filed: May 1, 2020

(65) Prior Publication Data

US 2020/0327260 A1 Oct. 15, 2020

Related U.S. Application Data

(63) Continuation of application No. 15/374,287, filed on Dec. 9, 2016, now Pat. No. 10,664,627.

(51) Int. Cl.

| | |
|---|---|
| *G06F 21/88* | (2013.01) |
| *G06F 21/57* | (2013.01) |
| *H04W 4/02* | (2018.01) |
| *H04W 4/70* | (2018.01) |
| *H04L 61/103* | (2022.01) |
| *H04W 12/126* | (2021.01) |
| *G06F 21/31* | (2013.01) |
| *H04L 101/622* | (2022.01) |

(52) U.S. Cl.
CPC ............ *G06F 21/88* (2013.01); *G06F 21/575* (2013.01); *H04L 61/103* (2013.01); *H04W 4/023* (2013.01); *H04W 4/025* (2013.01); *H04W 4/70* (2018.02); *H04W 12/126* (2021.01); *G06F 21/31* (2013.01); *H04L 2101/622* (2022.05)

(58) Field of Classification Search
CPC ........ G06F 21/88; G06F 21/575; G06F 21/31; H04L 61/103; H04L 61/6022; H04W 4/023; H04W 4/025; H04W 4/70; H04W 12/126
USPC .......................................................... 726/35
See application file for complete search history.

(56) References Cited

U.S. PATENT DOCUMENTS

| | | | |
|---|---|---|---|
| 9,083,624 B2 | 7/2015 | Westin | |
| 10,257,179 B1 * | 4/2019 | Saylor | ................ H04W 12/068 |

(Continued)

FOREIGN PATENT DOCUMENTS

| | | |
|---|---|---|
| CN | 103780754 A | 5/2014 |
| CN | 103945325 A | 7/2014 |

*Primary Examiner* — Kambiz Zand
*Assistant Examiner* — Aubrey H Wyszynski
(74) *Attorney, Agent, or Firm* — Mandy Barsilai Fernandez; Frank D. Cimino

(57) ABSTRACT

An end-user computing device can include a theft detector that maintains a registered host device list containing identifiers of at least one registered host device. The theft detector can have root access to operations of the end-user device and the theft detector can provides a secure reboot request in response to detecting a possible theft condition. The end-user computing device can also include a boot loader that executes a secure reboot of the end-user device in response to a secure reboot request from the theft detector. The secure reboot of the end-user device resets the end-user device to prevent access to the end-user device.

21 Claims, 6 Drawing Sheets

(56) References Cited

U.S. PATENT DOCUMENTS

| | | | |
|---|---|---|---|
| 2004/0068566 A1* | 4/2004 | Ogawa | H04L 29/12216 |
| | | | 709/245 |
| 2015/0228153 A1 | 8/2015 | Hendrick et al. | |
| 2016/0218958 A1 | 7/2016 | Lee | |
| 2017/0093804 A1* | 3/2017 | Boivie | H04L 63/10 |
| 2017/0171200 A1* | 6/2017 | Bao | H04W 12/069 |

* cited by examiner

| NODE NUMBER | HOSTNAME | IP ADDRESS | MAC ADDRESS | LOCATION |
|---|---|---|---|---|
| 1 | home.router | 216.196.248.2 | 12-34-56-78-9A-BC | LAT1, LONG1 |
| 2 | smartphone | 219.871.78.156 | 48-2C-6A-1E-59-3 | LAT2, LONG2 |
| 3 | coffee.shop | 197.719.48.78 | 78-8D-7B-3E-60-2 | LAT3, LONG3 |
| 4 | work.router | 193.198.487.183 | FF-FC-60-3F-61-78 | LAT4, LONG4 |
| 5 | | | | |
| CREDENTIAL | PASSCODE | | | |

| NODE NUMBER | HOSTNAME | NETWORK ADDRESS | MAC ADDRESS | LOCATION |
|---|---|---|---|---|
| 1 | emily.phone | 76-14-18-BB-7C-DF | 12-34-56-78-9A-BC | LAT1, LONG1 |
| 2 | joe.phone | 1A-CC-DD-58-8E-7F | 12-34-56-78-9A-BC | LAT2, LONG2 |
| 3 | dave.tablet | 65-45-83-2F-72-67 | 78-8D-7B-3E-60-2 | LAT3, LONG3 |
| 4 | | | | |
| 5 | | | | |
| CREDENTIAL | PASSCODE | | | |

US 11,704,446 B2

THEFT DETECTOR

CROSS-REFERENCE TO RELATED APPLICATIONS

This application is a continuation of U.S. patent application Ser. No. 15/374,287, filed Dec. 9, 2016, which is incorporated by reference herein in its entirety.

TECHNICAL FIELD

This disclosure relates to a theft detector. More particularly, this disclosure relates to a theft-detector for an end-user device.

BACKGROUND

The Internet of Things (IoT) is the internetworking of physical devices, vehicles (also referred to as "connected devices" and "smart devices"), buildings and other items that are embedded with electronics, software, sensors, actuators and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each computing device employing IoT (referred herein as an "IoT device") is uniquely identifiable through an embedded computing system and is able to interoperate within the existing Internet infrastructure.

IoT devices include home appliances (e.g., refrigerator, washer/dryer, cooking appliances, etc.), control devices (e.g., television tuners, thermostats, tools, etc.), vehicles and location devices (e.g., key or pet tags). As the proliferation of smart devices continues, IoT devices will continue to expand to other categories of devices.

Mobile phones and other electronic devices (including IoT devices) are frequently stolen. However, there is often very little (or nothing) that can be done to prevent data embedded in the stolen device from being accessed by the thief.

SUMMARY

One example relates to an end-user computing device that can include a theft detector that maintains a registered host device list containing identifiers of at least one registered host device. The theft detector can have root access to operations of the end-user device and the theft detector provides a secure reboot request in response to detecting a possible theft condition. The end-user computing device can also include a boot loader that executes a secure reboot of the end-user device in response to a secure reboot request from the theft detector. The secure reboot of the end-user device can reset the end-user device to prevent access to the end-user device.

Another example relates to a theft detector integrated circuit (IC) chip. The theft detector IC chip can be configured to maintain a registered host device list containing identifiers of at least one registered host device. The theft detector IC chip can also be configured to provide a secure reboot request in provided by the theft detector response to a boot loader in response to detecting a possible theft condition. The secure reboot of an end-user computing device can prevent access to the end-user computing device without entry of a passcode.

Yet another example relates to a method that can include requesting, by a theft detector operating on an Internet of Things (IoT) device a passcode in response to a request for communication with an unregistered host device, wherein the theft detector has root access to the IoT device. The method can also include executing a secure reboot of the IoT device in response to a failure to enter the passcode. The secure reboot of the end-user device resets the end-user device prevents access to the end-user device without entry of the passcode.

DETAILED DESCRIPTION

This disclosure relates to a theft detector for an end-user device. The theft detector can maintain a list of registered (preferred) host devices (network nodes) that have been previously authorized to communicate with an application executing on the end-user device. The theft detector can monitor a location of the end-user device and/or requests for communications with host devices not present in the registered host device list to identify a (possible) theft condition.

In response to detecting the theft condition, the theft detector can provide a boot loader with a secure reboot request. In response to the secure reboot request, the boot loader can execute a secure reboot of the end-user device. Upon execution of the secure reboot, the theft detector can execute anti-theft actions that can protect the data stored on the end-user device and prevent a thief (or other unauthorized user) from reusing the end-user device.

In some examples, the theft detector can be implemented as firmware or an application executing on the end-user device. In either situation, the theft detector can have full privileges (e.g., root access) to the end-user device to prevent malicious code (e.g., a malware) from being able to prevent the secure reboot and/or the execution of the anti-theft actions.

Figure 1:
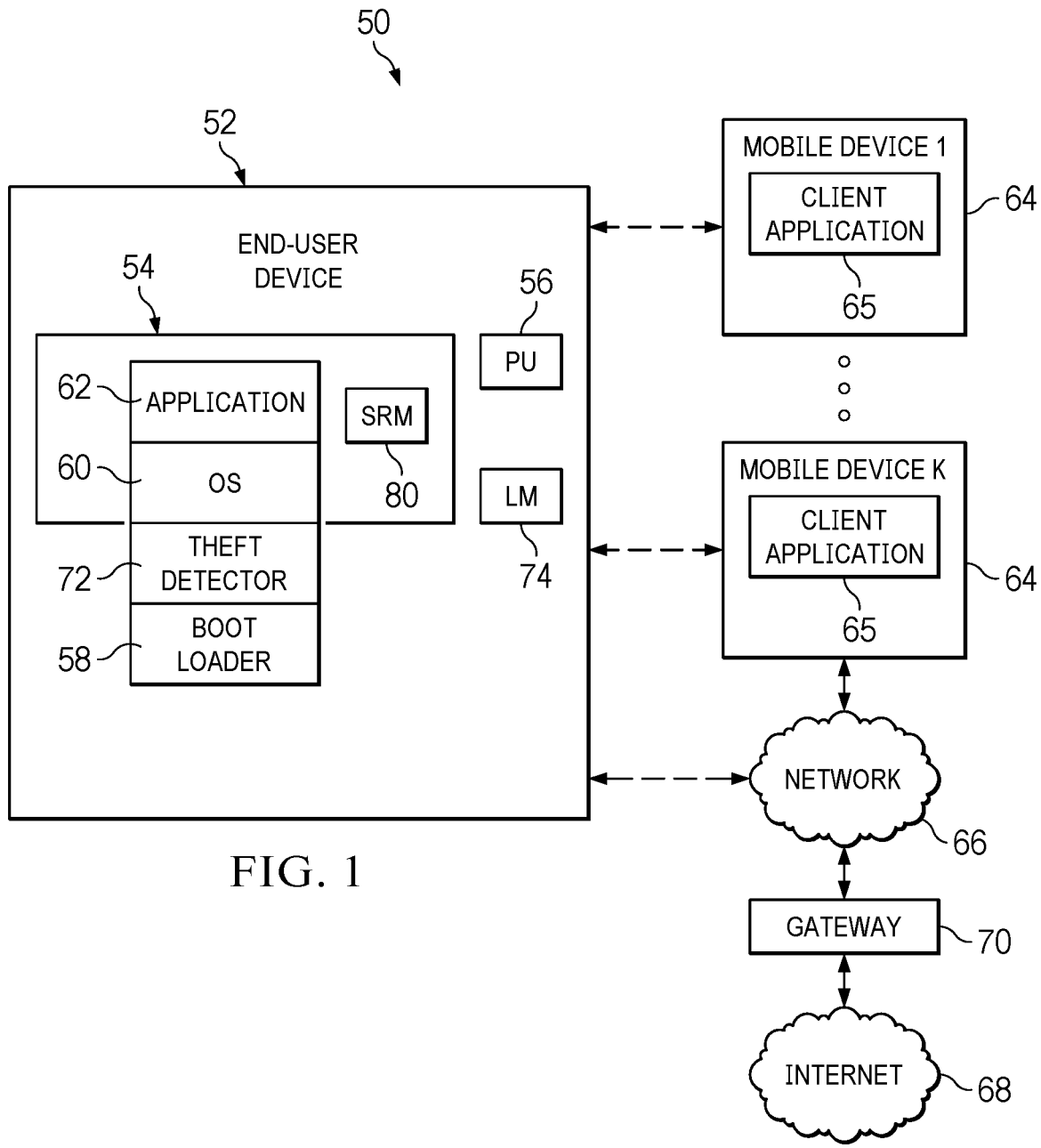
FIG. 1 illustrates an example of a system for detecting theft of an end-user device.

FIG. 1 illustrates an example of a system 50 for detecting a theft of an end-user device 52. The end-user device 52 can be a computing device. More particularly, the end-user device 52 can be an Internet of Things (IoT) device, a mobile phone (e.g., a smartphone), a laptop computer, etc. The end-user device 52 can have a memory 54 for storing machine readable instructions. The memory 54 can be implemented, for example, as non-volatile (e.g., flash memory and/or read-only memory (ROM)), volatile memory (e.g., random access memory) or a combination thereof. Moreover, in the present examples, the memory 54 can be representative of instructions embedded in a discrete integrated circuit (IC) chip. Additionally, the end-user device 52 can have a processing unit 56 (e.g., one or more processor cores) for accessing the memory 54 and executing the machine readable instructions.

The end-user device 52 can include a boot loader 58. The boot loader 58 can be a secure boot loader. The boot loader, in some examples, can be a discrete IC chip (e.g., an application specific integrated circuit (ASIC) chip). In other examples, the boot loader 58 can be software stored on the memory 54. The boot loader 58 can have machine readable instructions (e.g., computer code) that executes at power-up before an operating system (OS) 60 stored on the memory 54 is running. In some instances, the boot loader 58 may contain several ways to boot the kernel of the OS 60 and/or commands for debugging and/or modifying the kernel environment. The OS 60 can be, for example, a real-time OS (RTOS), a high-level OS (HLOS).

The OS 60 can be a general purpose OS, such as Android, iOS, Windows, Linux, macOS, etc. Alternatively, the OS 60 can be a specific purpose OS, such as an OS specifically designed for an IoT device. The OS 60 can have an application 62 executing on top of the OS 60.

The application 62 can include a user interface (UI), such as a graphical user interface (GUI), a button interface (real or virtual buttons), etc. In some examples, the UI of the application 62 can be output on an external device, such as situations where the end-user device 52 is an IoT device. For instance, in such a situation, the application 62 can communicate with a mobile/host device 64 (e.g., a smart phone or a computer) via a network 66 (e.g., a local area network) and/or a mesh network (e.g., a Bluetooth network), and the mobile device 64 can provide a GUI to a user via a particular application (e.g., an "app") and/or a web browser. Moreover, the application 62 can communicate with one or more servers operating on the Internet 68 via a gateway 70 (host device). The application 62 can be programmed to execute one or more user tasks based on data (e.g., sensitive or configuration data) stored in the memory 54. The end-user operations can vary based on the category of the end-user device 52.

The gateway 70 can be implemented as a home or business Internet gateway. In this manner, network traffic flowing between nodes of the network 66 and a node on the Internet 68 flows through the gateway 70. In some examples, the gateway 70 can include a Dynamic Host Configuration Protocol (DHCP) that can assign dynamic Internet Protocol (IP) addresses to nodes of the network 66. Moreover, in some examples, the gateway 70 may have a static IP address. In other examples, the gateway 70 may have a dynamic IP address assigned by an Internet Service Provider (ISP).

The end-user device 52 can also include a theft detector 72. The theft detector 72 can be implemented on an IC chip. In some examples, the theft detector 72 can be a stand-alone IC chip. In other examples, the theft detector can be integrated with another IC chip, such as an IC chip implementing the boot loader 58. The theft detector 72 contains machine readable instruction to operate with root access ("administrative privileges" or "full privileges") to the end-user device 52. That is, the theft detector 72 can monitor incoming and outgoing network packets and cause the processing unit 56 to execute low level commands. Moreover, the theft detector 72 is not limited by privileges controlled by the OS 60, in contrast to the application 62.

In some examples, the theft detector 72 can be implemented as firmware. For example, the theft detector 72 can be implemented as an ASIC chip, with embedded instructions. In other examples, the theft detector 72 can be implemented as a ROM module of the processing unit 56. In still other examples, the theft detector 72 can be implemented as an application executing on the OS 60 that has root access to the end-user device 52.

The end-user device 52 can include a location monitor 74. The location monitor 74 can be implemented, for example, as a device (e.g., an IC chip) that can determine location information (e.g., latitude and longitude coordinates) for the end-user device 52. The location monitor 74 can be implemented, for example, as a satellite signal receiver the can calculate the location information based on the received satellite signals. For example, the location monitor 74 can be implemented as a global navigation satellite system (GNNS) signal receiver (e.g., a global position satellite (GPS) signal receiver, a GLONASS satellite receiver, etc.). Additionally or alternatively, the location monitor 74 can calculate the location information based on terrestrial signals transmitted by cell towers.

The theft detector 72 can continuously monitor the end-user device 52 to attempt to detect a theft of the end-user device 52. To facilitate explanation of the theft detector 72, several extended examples are described. In a first extended example (hereinafter, "the first example"), it is presumed that the end-user device 52 is an IoT device that can communicate on the network 66, such as a smart watch. In such a situation, the mobile device 64 can be a smart phone that is paired with the end-user device 52 and the gateway 70 can provide an Internet portal to the end-user device 52.

Upon an initial startup of the end-user device 52, the boot loader 58 causes the OS 60 to load. Moreover, in the first example, the end-user device 52 can be assigned an Internet Protocol (IP) address by the gateway 70. Additionally, the application 62 can communicate with the mobile device 64. The theft detector 72 can cause a UI to prompt the user for authentication credentials (e.g., username and password or only a passcode/password). If the user is a new user, the user can employ the UI to generate the authentication credentials.

In some examples, the UI of the theft detector 72 can be integrated with the UI of the application 62. In other examples, the UI of the theft detector 72 can operate independently of the application 62. Moreover, similar to the UI of the application, in some situations, the UI of the theft detector 72 can operate on the mobile device 64. For instance, upon the client application 65 (or web browser) of the mobile device 64 attempting to contact the client application 65 executing on the end-user device 52 (e.g. in a pairing procedure), the theft detector 72 can cause the client application 65 to prompt the user of the end-user device 52 for the credentials for authentication.

Continuing with the first example, upon authenticating, the theft detector 72 can store the assigned IP address, an IP address and media access controller (MAC) address for both the mobile device 64 and the gateway 70 in a list of registered host devices (a registered host device list), which registered host device list is stored in a non-volatile portion of the memory 54, thereby registering the mobile device 64 and the gateway 70. Thus, upon registration, the mobile device 64 and the gateway 70 can respectively be referred to as a registered mobile device 64 and a registered gateway 70. Additionally, the theft detector 72 can query the location monitor 74 for current location information for the end-user device 52, which location information can be associated with the registered gateway 70 and stored in the registered host device list.

The registered host device list can include multiple instances of registered mobile devices 64 and/or registered gateways 70. In each situation, upon detecting a request for communication (pairing) with a new mobile device and/or new gateway (a new host device), the UI of the theft detector 72 can cause prompt the user to enter the credentials. Upon successfully entering the credentials, the IP address and MAC address of the new mobile device and/or the new gateway is added to the registered host device list.

As noted, the registered gateway 70 may have a dynamic IP address. Moreover, the registered mobile device 64 (in the first example) is presumed to have a dynamic IP address assigned by the registered gateway 70. Thus, periodically or asynchronously, the IP address of the registered mobile device 64 and/or the registered gateway 70 can change. The theft detector 72 can monitor the IP address packets of incoming and outgoing packets. In such a situation, upon detecting communication with a new IP address, the theft detector 72 can extract the MAC address associated with the new IP address. The theft detector 72 can examine the registered host device list to determine whether the MAC address of the new IP address matches a MAC address of a registered host device stored in the registered host device list. If the MAC address of the new IP address matches the MAC address associated with a registered host device, the theft detector 72 updates the registered host device list to associate the new IP address with the registered host device. The theft detector 72 can perform this update automatically (e.g., without interaction with the user).

Alternatively, if the MAC address associated with the new IP address does not match a MAC address in the registered host device list, the theft detector 72 can employ the UI to prompt the user for the credentials. If the user correctly enters the credentials, the new IP address and the new MAC address are added to the registered host device list.

Additionally or alternatively, in the first example, the theft detector 72 can monitor the location of the end-user device 52 by periodically (or asynchronously) querying the location monitor 74 for current location information of the end-user device 52. The current location information can be compared against the location information stored in the registered host device list. If the current location information indicates that the end-user device 52 has moved by a threshold distance (e.g., 1 kilometer), the theft detector 72 can employ the UI to prompt the user for the credentials. If the user correctly enters the credentials, the current location information is recorded in the registered host device list.

Figure 2:
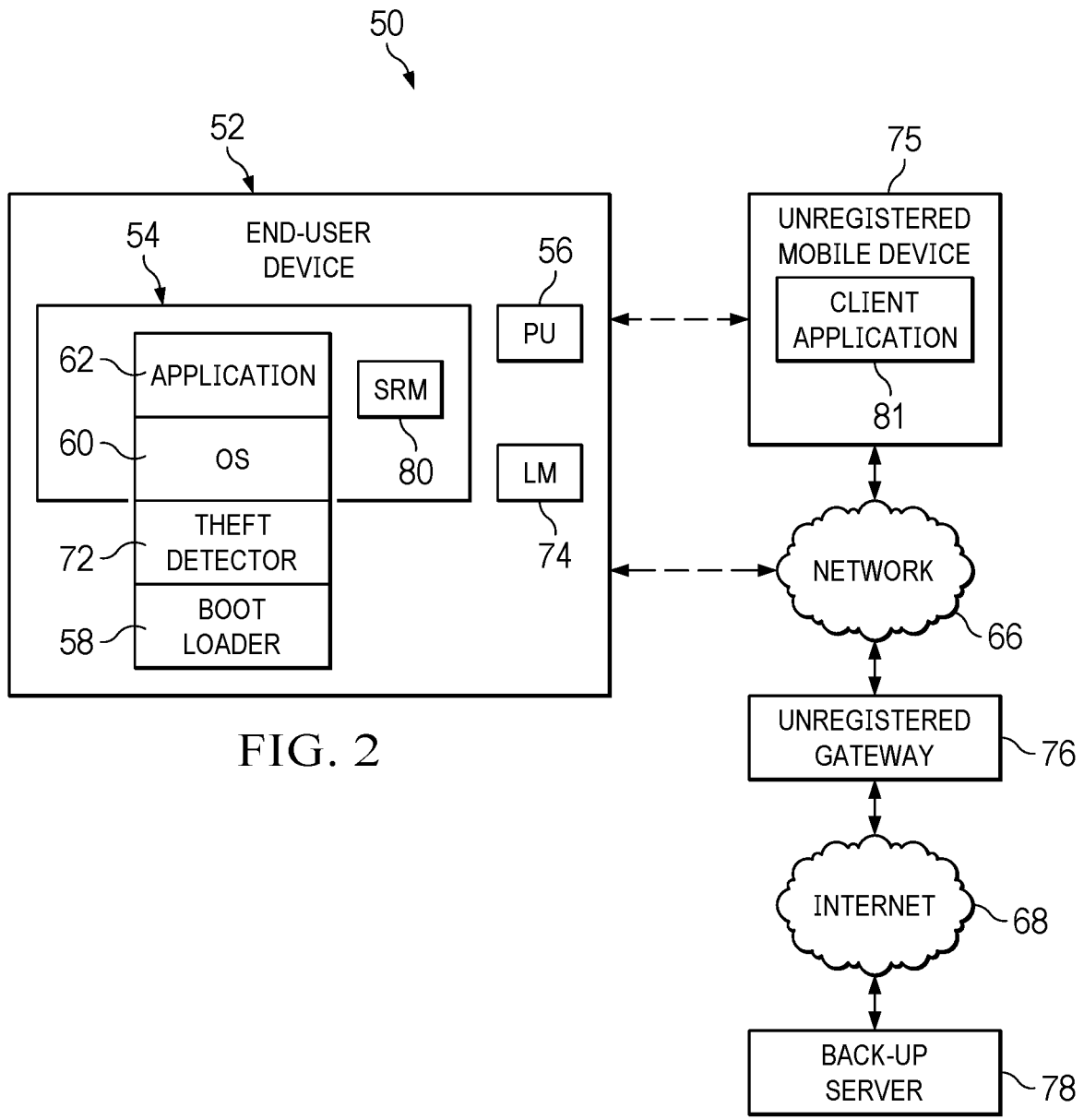
FIG. 2 illustrates an example of a system that detects a possible theft of an end-user device.

Continuing with the first example, in situations where the user fails to correctly input the credentials, the theft detector 72 can trigger/detect a (possible) theft condition. Alternatively, in some examples, the theft detector 72 can trigger the theft condition prior to a request for the credentials. FIG. 2 illustrates the system 50 in a situation where the theft detector 72 triggers the theft detection condition in the first example. For purposes of simplification of explanation, the same reference numbers are employed in FIGS. 1 and 2 to denote the same structure.

In FIG. 2, the theft detector 72 detects a new IP address from an unregistered (unknown) mobile device 75 and/or an unregistered gateway 76. As noted, in such a situation, the theft detector 72 attempts to match the MAC address associated with the new IP address with a MAC address stored in the registered host device list. Upon finding no match, the theft detector 72 prompts the user for the credentials. Upon the user failing to enter the correct credentials, the theft detector 72 triggers/detects a (possible) theft condition, which mode indicates that a possible theft of the end-user device 52 has occurred.

Upon detecting the theft condition, the theft detector 72 can provide a secure reboot request to the boot loader 58 commanding the boot loader 58 to execute a secure reboot of the end-user device 52. In response, the boot loader 58 can access a ROM portion of the memory 54 that stores a secure reboot module 80. The secure reboot module (labeled as "SRM") 80 can store procedures for executing the secure reboot. Initially, upon executing the secure reboot, the end-user device can be reset (e.g., rebooted). It is noted that in FIG. 1, the secure reboot module 80 is represented as a being separate from the theft detector 72 and the boot loader 58. However, in some examples, the secure reboot module 80 can be integrated with the theft detector 72 and/or the boot loader 58 (e.g., on an IC chip).

Additionally, in some examples, the secure reboot can be executed upon the theft detector 72 detecting that the end-user device 52 has moved beyond a threshold distance (as described herein). Accordingly, in some examples, the end-user device 52 may execute the secure reboot prior to a failure of entering the credentials. In such situations, upon executing the secure reboot, the UI of the theft detector 72 can prompt the user for the credentials. Upon failure to enter the credentials, the theft detector can control the secure reboot to cause the end-user device 52 to execute anti-theft actions.

The anti-theft actions of the secure reboot can include an attempt to back-up the data of the end-user device 52 (the contents of at least a portion of the memory 54). To back-up the data, the theft detector 72 can attempt to contact a back-up server 78 (e.g., a cloud server) operating on the Internet 68. In some examples, the theft detector 72 can attempt to securely transmit the data through the unregistered gateway 76 or the unregistered mobile device 75 to the back-up server 78.

Additionally, the anti-theft actions of the secure reboot include an attempt to notify a predetermined contact. The predetermined contact can be, for example, an registered owner of the end-user device 52, a service provider (e.g., for an IoT), an Original Equipment Manufacturer (OEM) supplier, a governmental agency (e.g., a police department), etc. In one example, to notify the predetermined contact, the theft detector 72 can attempt to send an email to an email address associated with the predetermined contact. In another example, the theft detector 72 can send a message in a proprietary format (e.g., an encrypted message format) to the predetermined contact. The message can include, for example, a time stamp and a current location (calculated by the location monitor 74) of the end-user device 52. The notification to the predetermined contact can include a request to block services for the end-user device 52. In response (in some examples), the predetermined contact may block further services for the end-user device 52 and/or cease further communication with the end-user device 52 (e.g., "blacklisting").

Furthermore, the anti-theft actions of the secure reboot can include blocking operations of the application 62 and/or the OS 60 that are related to monetary transactions and/or the employment of secure data. For instance, the anti-theft actions can include preventing the execution of an instance of the application 62 configured to implement bank and/or credit card transactions. Additionally or alternatively, the anti-theft actions can include preventing the execution of an application 62 that requests secure data, such as a username and/or passphrase (password) and/or biometric data (e.g., fingerprint data, iris detection data, voice data, etc.). Such an application 62 could be, for example, an online banking application, a keycard access application, etc.

Further still, the anti-theft actions of the secure reboot can include erasing (wiping) the contents of the memory 54 of the end-user device 52 to prevent unauthorized access to secure data. Additionally, the anti-theft actions of the secure reboot can write a theft tag to a non-volatile portion of the memory 54, which theft tag indicates that the end-user device 52 has been stolen. Presence of the theft tag can prevent the application 62 from providing services (e.g., IoT services) to a client application 81 executing on the unregistered mobile device 75 (or any other mobile device).

Referring back to FIG. 1, in a second extended example (hereinafter, "the second example"), it is presumed that the end-user device 52 is an IoT device communicating on a mesh network protocol (e.g., a Bluetooth network, a Bluetooth Low Energy (BLE) network, a ZigBee network, etc.). In the second example, the end-user device 52 can be a shared IoT device, such as a proximity tag for a pet, a key finder or a vehicle.

In the second example, the end-user device 52 may or may not have an IP address assigned and/or may not be in communication with the gateway 70. In the second example, the end-user device 52 has a mesh network address assigned thereto (e.g., a Bluetooth address/identifier (ID) or a ZigBee address/ID).

In the second example, upon an initial startup of the end-user device 52, the boot loader 58 causes the OS 60 to load. Moreover, in the second example, the end-user device 52 (via the application 62) can be paired with the first mobile device 64 (e.g., mobile device 1) of K number of mobile devices 64 via the meshed network protocol, where K is an integer greater than or equal to one. The theft detector 72 can cause a UI to prompt the user for authentication credentials (e.g., username and passcode/password or only a passcode/password). If the user is a new user, the user can employ the UI to generate the authentication credentials.

Continuing with the second example, upon authenticating, the theft detector 72 can store the meshed network address of the first mobile device 64 in a registered host device list, which registered host device list is stored in a non-volatile portion of the memory 54, thereby registering the first mobile device 64. Thus, upon registration, the first mobile device 64 is referred to as a first registered mobile device 64. Additionally, the theft detector 72 can query the location monitor 74 for current location information for the end-user device 52, which location information can be associated with the registered gateway 70, and store the location information in the registered host device list.

The registered host device list can include multiple instances (K number) of mobile devices 64. In each situation, upon detecting a new mobile device 64 (a non-registered mobile device), the theft detector 72 can provide the boot loader 58 with a secure reboot request causing the boot loader 58 to execute a secure reboot. Additionally or alternatively, the theft detector 72 can periodically (or asynchronously) monitor a current location of the end-user device 52 in a manner described herein. If the theft detector 72 detects that the end-user device 52 has moved more than a threshold distance (e.g., 1 kilometer) and none of the K number of registered mobile devices are detectable through the mesh network format, the theft detector 72 can also provide the secure reboot request to the boot loader 58.

Figure 3:
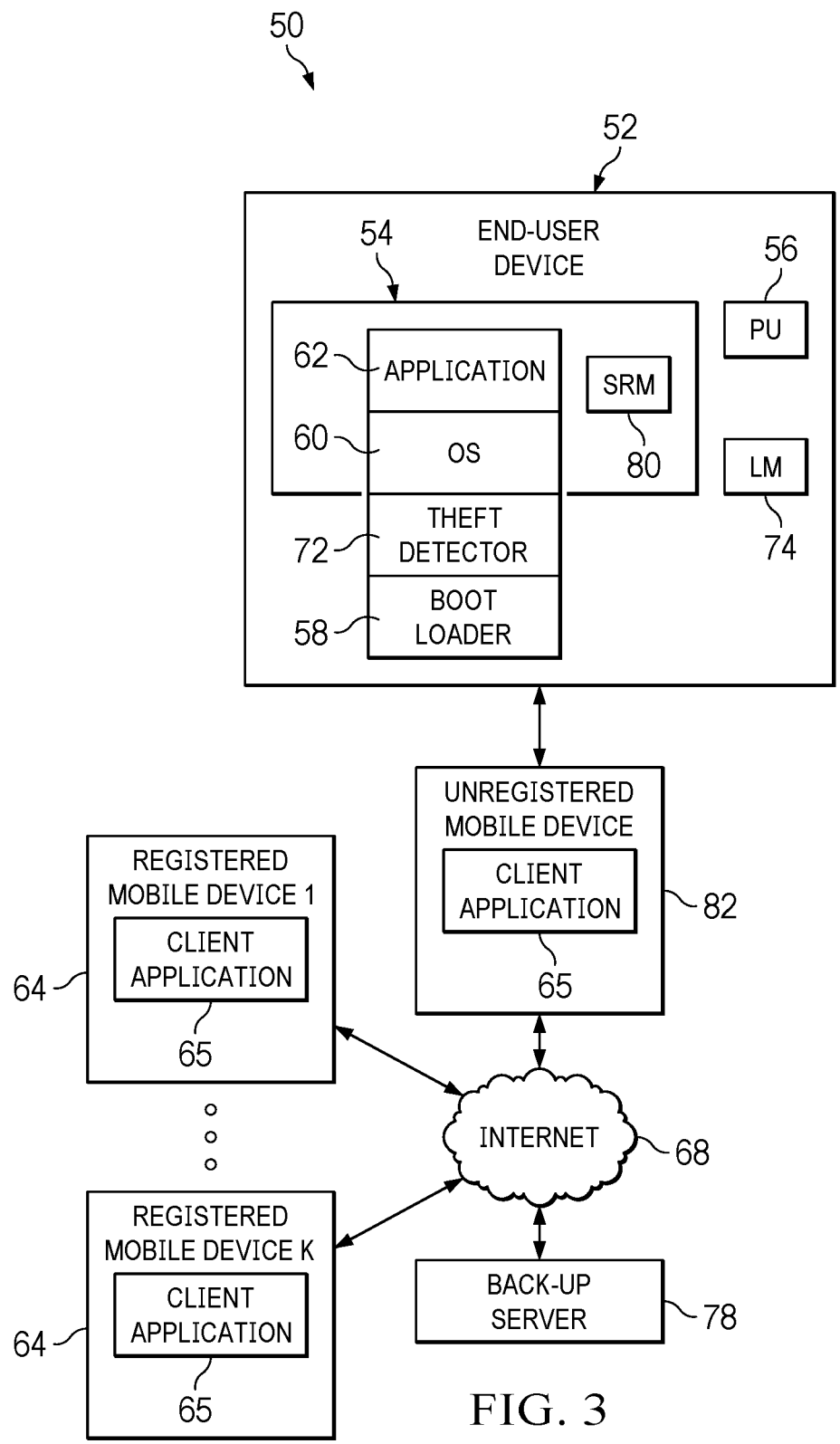
FIG. 3 illustrates another example of a system that detects a possible theft of an end-user device.

FIG. 3 illustrates an example of the system 50, in the second example wherein an unregistered mobile device 82 attempts to pair with the end-user device 52. For purposes of simplification of explanation, the same reference numbers are employed in FIGS. 1-3 to denote the same structure.

Continuing with the second example in FIG. 3, in response to the request by the theft detector 72 to execute the secure reboot, the boot loader 58 can access the secure reboot module 80 and perform a secure reboot (e.g., reset) of the end-user device 52. To execute the secure reboot, the boot loader 58 can retrieve the secure reboot module 80 from the ROM of the end-user device 52 and execute an authentication procedure characterized in the secure reboot module 80.

The authentication procedure can include sending a secure message to each of the K number of registered mobile devices 64 (or some subset thereof) requesting that the unregistered mobile device 82 be added to the registered host device list. In some examples, the secure message can be sent to the K number of registered mobile devices 64 via the meshed network protocol (e.g., a direct wireless link). Additionally, in some examples, the theft detector 72 can cause a client application 65 executing on the unregistered mobile device 82 to send a message via the Internet 68 to the K number of registered mobile devices 64.

In response to receipt of the secure message, each of the K number of registered mobile devices 64 (or some subset thereof) can prompt a user for the credentials. If the user of one or more of the K number of registered mobile devices 64 provides the credentials via a corresponding client application 65, a secure authorization message is returned to the theft detector 72 of the end-user device 52. In response to the secure authorization message, the unregistered mobile device 82 can be added to the registered host device list.

In situations where the credentials are either not entered at one or more of the K number of registered mobile devices 64 within a predetermined time (e.g. 5-10 minutes) or are entered incorrectly (e.g., wrong username or passcode/password), the theft detector 72 can control the secure reboot and execute anti-theft actions.

The anti-theft actions in the second example can include an attempt to back-up the data of the end-user device 52 (the contents of at least a portion of the memory 54). To back-up the data of the end-user device 52, the theft detector 72 can attempt to contact the back-up server 78 (e.g., a cloud server) operating on the Internet 68. In some examples, the theft detector 72 can attempt to securely transmit the data through the unregistered mobile device 82 to the back-up server 78.

Furthermore, the anti-theft actions of the secure reboot can include erasing (wiping) the contents of the memory 54 and/or a service subscription of the end-user device 52 to prevent unauthorized access to secure data. Additionally, the anti-theft actions of the secure reboot can write a theft tag to a non-volatile portion of the memory 54, and the theft tag indicates that the end-user device 52 has (possibly) been stolen. Presence of the theft tag can prevent the application 62 from providing services (e.g., IoT services) to a client application 84 executing on the unregistered mobile device 75 (or any other mobile device).

Referring back to FIG. 1, in both the first and second examples, upon subsequent rebooting (e.g., resetting) of the end-user device 52, the boot loader 58 can examine the theft tag, thereby causing the boot loader 58 to re-execute the secure reboot, wherein some (or all) of the anti-theft actions can be repeated. In some such examples, a subsequent correct entry of the credentials may cause the theft detector 72 to remove the theft tag, and cause the boot loader 58 to reload the OS 60 and operate in standard operating mode.

Moreover, in the first example and the second example, upon execution of the secure reboot, an unauthorized user (e.g., a thief) is prevented from accessing sensitive data that may be stored in the end-user device 52. Additionally, the unauthorized user is also prevented from re-using the end-user device 52, thereby reducing the incentive to steal the end-user device 52.

Figures 4, 5:
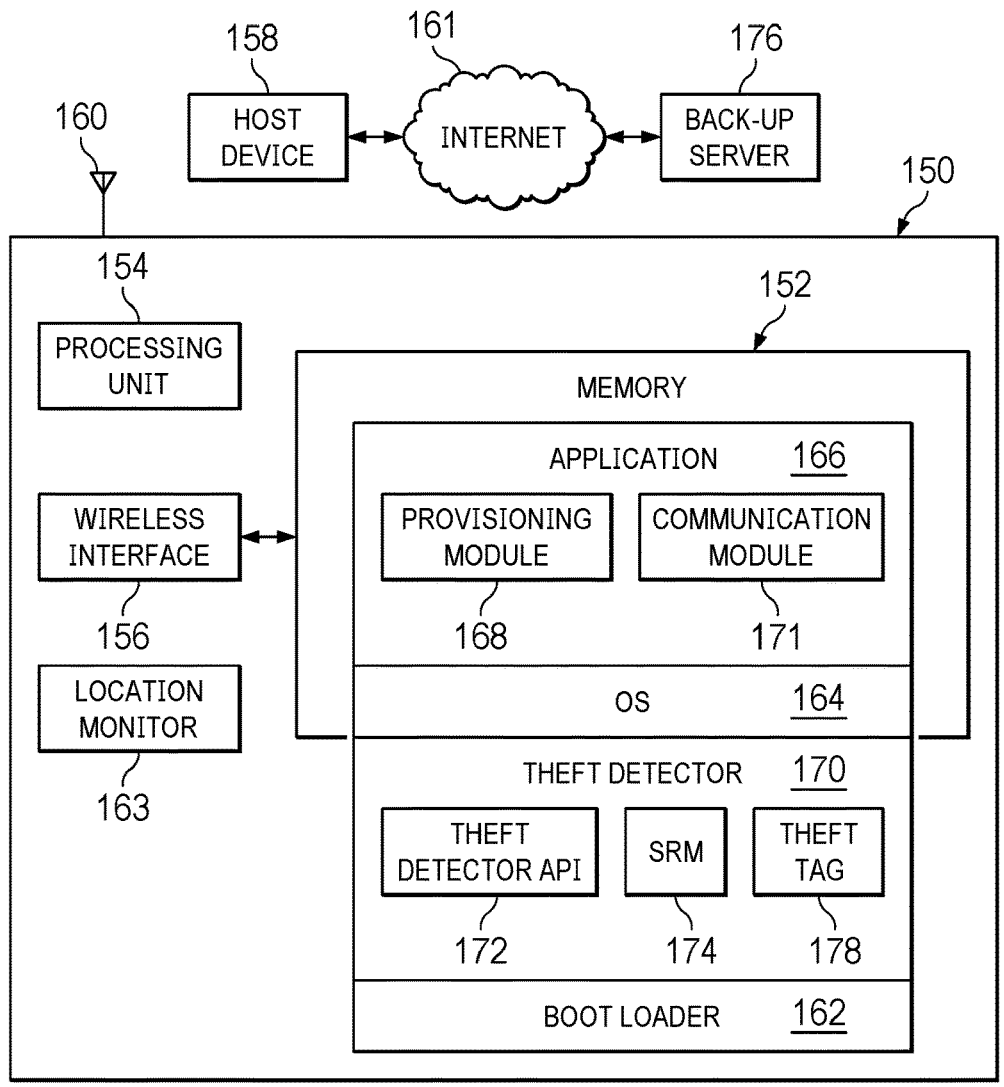
FIG. 4 illustrates an example of an end-user device that can detect theft.
FIG. 5 illustrates an example of a registered host device list.

FIG. 4 illustrates an example of an end-user device 150 that can execute anti-theft actions. The end-user device 150 could be employed, for example, as the end-user device 52 of FIG. 1. The end-user device 150 could be implemented, for example, as a wireless enable device, such as an IoT device, a smart phone, a feature phone, a tablet computer, etc. The end-user device 150 can include a memory 152 to store data and machine readable instructions. The memory 152 can be implemented, for example, as a non-transitory machine readable medium. In some examples, the memory 152 can include volatile memory (e.g., random access memory) and/or nonvolatile memory, such as flash memory, a solid state drive a hard disk drive or a combination thereof as well as ROM (e.g., non-erasable memory). The end-user device 150 can also include a processing unit 154 configured to access the memory 152 and execute the machine readable instructions. The processing unit 154 can include one or more processor cores. In some examples, the one or more processor cores can be implemented on one or more IC chips with specific functions (e.g., a controller or ASIC).

The end-user device 150 can include a wireless interface 156 that can communicate with a host device 158 via an antenna 160. The wireless interface 156 can communicate via a standard wireless communication protocol, such as a protocol of a carrier network, Wi-Fi, Bluetooth, ZigBee, etc. Additionally or alternatively, the wireless interface 156 can communicate on a carrier network, such as a Long Term Evolution (LTE) network, a 4th Generation (4G) network, a 3rd Generation Partnership Project (3GPP), a 3rd Generation (3G) network, etc.

The host device 158 can be a network node that can provide access to the Internet 161. The host device 158 can be, for example, a WiFi router, a Bluetooth or ZigBee access point (e.g., a hotspot), a smart phone, another end-user device, etc. Thus, as described herein, the end-user device 150 can have direct or indirect Internet 161 access.

In some examples, the end-user device 150 can further include a location monitor 163. The location monitor 163 can be configured to determine location information for the end-user device 150. The location information can be implemented as longitude and latitude coordinates of the end-user device 150. In some examples, the location information can be based on received radio frequency (RF) signals that are transmitted from satellites (e.g., GNSS satellites). In other examples, the location information can be based on a triangulation of RF signals received from cell towers at the antenna 160.

The end-user device 152 can include a boot loader 162. The boot loader 162 can be implemented, for example as an IC chip and/or as instructions stored on the memory 152. The boot loader 162 can include machine readable instructions (e.g., computer code) that executes at power-up before an OS 164 stored on the memory 152 is executed. In some instances, the boot loader 162 may contain several ways to boot the kernel of the OS 164 and/or commands for debugging and/or modifying the kernel environment. The OS 164 can be, for example, a real-time OS (RTOS), a high-level OS (HLOS).

The OS 164 can be a general purpose OS, such as Android, iOS, Windows, Linux, macOS, etc. Alternatively, the OS 164 can be a specific purpose OS, such as an OS specifically designed for an IoT device. The OS 164 can have an application 166 executing on top of the OS 164.

The application 166 can include a user interface (UI), such as a graphical user interface (GUI), a button interface (real or virtual buttons), etc. In some examples, the UI of the application 166 can be output on an external device, such as situations where the end-user device 150 is an IoT device.

The application 166 can include a provisioning module 168 (e.g., a software module) that can communicate with a theft detector 170. The theft detector 170 can be implemented as firmware (e.g., a discrete IC chip) and/or as a software application with privileged access (e.g., root access) to the features of the end-user device 150. The theft detector 170 can include a theft detector application programming interface (API) 172, which may be stored in the memory 152, that can be leveraged by other modules (including the application 166) to further assist in detecting theft.

The provisioning module 168 can provide a registered host device list (a preferred network node list) to the theft detector 170. The registered host device list can be, for example, a list of host devices that have been paired with the end-user device 150. The registered host device list can include identifiers for a list of pre-approved host devices (one of which could be the host device 158). The registered host device list could be encrypted and can be stored by the theft detector 170. FIG. 5 illustrates an example of a registered host device list 200 that can be stored by the theft detector 170 in a non-volatile portion of the memory 152. The theft detector 170 can maintain the registered host device list (e.g., add and remove entries). The registered host device list 200 can include up to a predetermined number (e.g., five) of registered host devices (network nodes). Each host device in the registered host device list 200 can have a hostname (e.g., a domain name services (DNS) name), an assigned IP address, a MAC address, and a location (provided by the location monitor 163). Additionally, the registered host device list 200 can include (or be linked to) a credential, which can be, a passcode/password and (in some examples) a username.

Referring back to FIG. 4, the theft detector 170 can include a self-timed loop that can continuously monitor activity of the end-user device 150 to detect theft. For example, the theft detector can periodically (or asynchronously) query the location monitor for a current location of the end-user device 150. The current location (latitude and longitude coordinates) can be compared to the coordinates of each registered network node in the registered host device list 200. In the event that the current location of the end-user device 150 exceeds a predetermined threshold, the theft detector 170 can actuate an authentication condition or a (possible) theft condition.

Additionally or alternatively, a communication module 171 can also communicate with the theft detector 170 (e.g., via the theft detector API 172). The communication module 171 can provide information characterizing a request for a pairing a new host device with the end-user device 150. The new host device can have an IP address that is not in the registered host device list 200. The request can include a hostname, an IP address, a MAC address and a location associated with the new host device. The theft detector 170 can compare the MAC address of the new host device with the MAC addresses of each network node in the registered host device list 200. If the MAC address of the new host device matches a MAC address of the new host device, the theft detector 170 can update the registered host device list

200 to include the new host device. That is, the theft detector 170 can overwrite the hostname (if changed), the IP address and the location of the previous host device with the identifiers associated with the new host device. Such an update can be needed, for example, in situations where the IP address of a registered host device has changed (e.g., due to dynamic addressing). Moreover, in this manner, no user-intervention is needed in response to a change of an IP address In situations where the theft detector 170 does not find a match of the MAC address of the new host device with a MAC address in the registered host device list 200, the theft detector 270 can actuate the authentication condition and/or the theft condition.

In some examples, upon actuation of the authentication condition, the application 166, the theft detector 170 (or a client executing on the new host device) can prompt a user for the credentials (e.g., the passcode/password associated with the registered network node list 200). If the credentials are correctly entered, the new host device (particularly, the identifiers of the new host device) is added to the registered host device list 200. If the credentials are not entered correctly, the theft detector 170 can actuate a theft detection trigger.

Upon actuation of a theft detection condition, the theft detector 170 can provide a secure reboot request to the boot loader 162. Upon receipt of such a secure reboot request, the boot loader 162 can access a secure reboot module (SRM) 174 and execute commands stored therein causing the end-user device 150 to execute a secure reboot (reset). The secure reboot module 174 can be stored in a portion of the ROM of the end-user device 150. In some examples, the secure reboot module 174 can be embedded in an IC chip integrated with the theft detector 174. In other examples, the secure reboot module 174 can be stored separate from the theft detector 170, such as in a stand-alone IC chip and/or in a ROM associated with the boot loader 162.

The theft detector 170 can control the operations of the secure reboot. Such operations can include actuation of the authentication condition and/or anti-theft actions. The anti-theft actions of the secure reboot can include an attempt to back-up the data of the end-user device 150 (the contents of at least a portion of the memory 152). To back-up the data, the theft detector 170 can attempt to contact a back-up server 176 (e.g., a cloud server) operating on the Internet 161. In some examples, the theft detector 170 can attempt to securely transmit the data through the new host device (via the wireless interface 156) to the back-up server 176.

Additionally, the anti-theft actions of the secure reboot can include an attempt to notify a predetermined contact. The predetermined contact can be, for example, a registered owner of the end-user device 150, a service provider, an OEM supplier, a governmental agency (e.g., a police department), etc. In one example, to notify the predetermined contact, the theft detector 170 can attempt to send an email to an email address associated with the predetermined contact. In another example, the theft detector 170 can send a message in a proprietary format (e.g., an encrypted message format) to the predetermined contact. The notification to the predetermined contact can include, for example, a time stamp and/or a current location of the end-user device 150.

Furthermore, the anti-theft actions of the secure reboot can include erasing (wiping) the contents of the memory 152 of the end-user device 150 to prevent unauthorized access to sensitive data. Additionally, the anti-theft actions of the secure reboot can write a theft tag 178 to a non-volatile portion of the memory 54, which theft tag 178 indicates that the end-user device 52 has been stolen. Presence of the theft tag 178 can prevent the application 166 from providing services (e.g., IoT services) to a client application executing on the new host device (or any other mobile device).

Upon subsequent rebooting (e.g., resetting) the end-user device 150, the boot loader 162 can examine the theft tag 178, thereby causing the boot loader 162 to execute a secure reboot, wherein some (or all) of the anti-theft actions can be repeated. In this manner, upon execution of the secure reboot, an unauthorized user (e.g., a thief) is prevented from accessing sensitive data that may be stored in the end-user device 150. Additionally, the unauthorized user is also prevented from re-using the end-user device 150.

Figure 6:
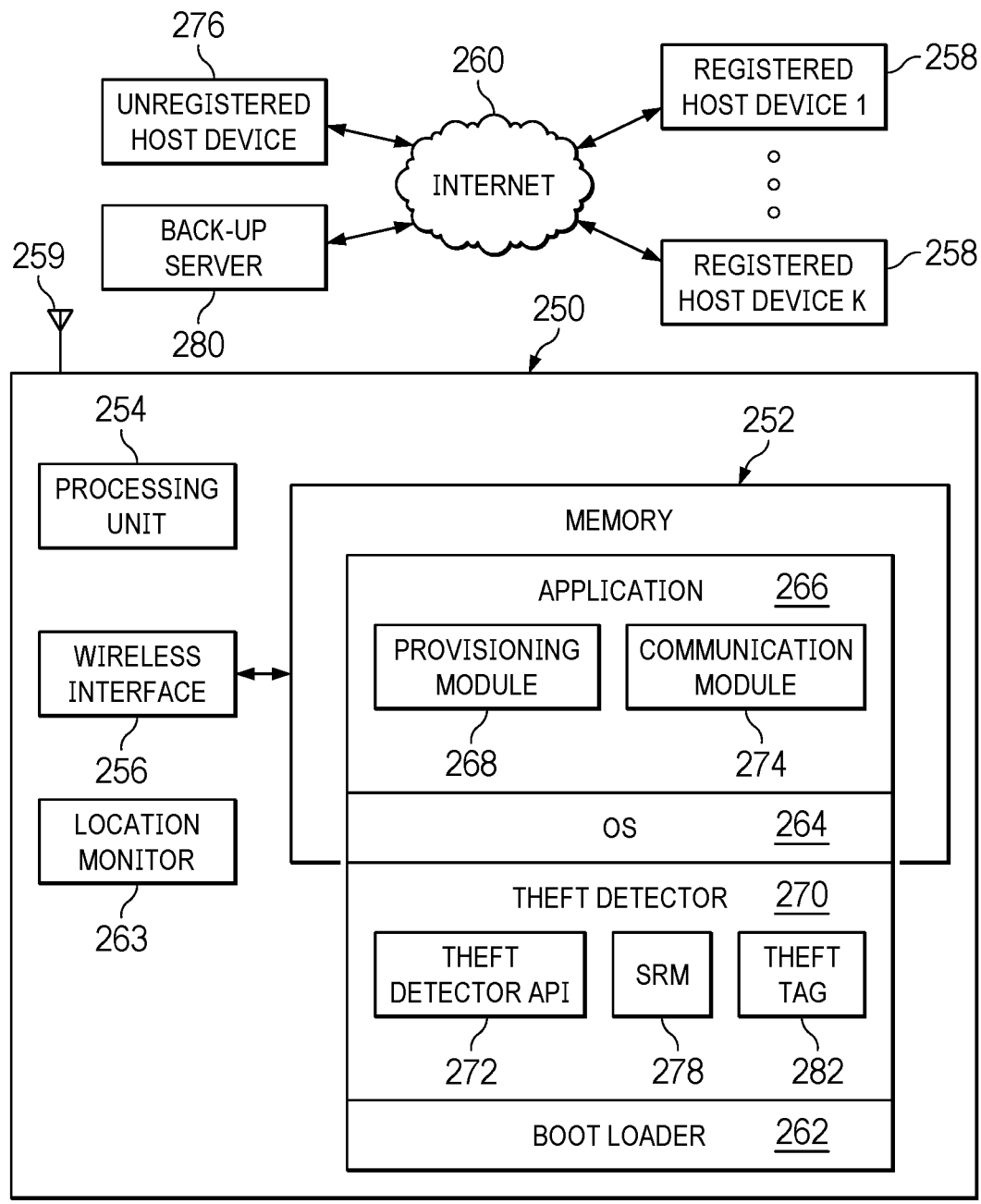
FIG. 6 illustrates another example of an end-user device that can detect theft.

FIG. 6 illustrates another example of an end-user device 250 that can detect theft and execute anti-theft actions. The end-user device 250 could be employed, for example, as the end-user device 52 of FIG. 1. The end-user device 250 could be implemented, for example, a moveable/portable IoT device, such as a pet tag, a key/wallet finder, a medical device (e.g., a glucose monitor), a vehicle, etc. The end-user device 250 can include a memory 252 for storing data and machine readable instructions. The memory 252 can be implemented, for example, as a non-transitory machine readable medium. In some examples, the memory 252 can include volatile memory (e.g., random access memory) and/or nonvolatile memory, such as flash memory, a solid state drive a hard disk drive or a combination thereof as well as ROM (e.g., non-erasable memory). The end-user device 250 can also include a processing unit 254 configured to access the memory 252 and execute the machine readable instructions. The processing unit 254 can include one or more processor cores. One or more of the processor cores may be implemented on an IC chip to execute a specific set of embedded machine instructions.

The end-user device 250 can include a wireless interface 256 that can communicate with K number of registered host devices 258 via an antenna 259. The wireless interface 256 can communicate via a meshed network protocol, such as Bluetooth, BLE, ZigBee, etc.

Each of the K number of registered host devices 258 can be a network node that can provide access to the Internet 262. Each of the K number of registered host devices 258 can be, for example, a smart phone, a computing device (e.g., a tablet computer, a another end-user device, etc.). Each of the K number of registered host devices 258 can provide a portal for access to the Internet 260. Thus, as described herein, the end-user device 250 can have indirect Internet 206 access.

In some examples, the end-user device 250 can further include a location monitor 263. The location monitor 263 can be configured to determine location information for the end-user device 250. The location information can be implemented as longitude and latitude coordinates of the end-user device 250. In some examples, the location information can be based on received RF signals that are transmitted from satellites. In other examples, the location information can be based on a triangulation of RF signals received from cell towers at the antenna 260.

The memory 252 can include a boot loader 262. The boot loader 262 can be machine readable instructions (e.g., computer code) that executes at power-up before an OS 264 stored on the memory 252 is executed. In some instances, the boot loader 262 may contain several ways to boot the kernel of the OS 264 and/or commands for debugging and/or modifying the kernel environment. The OS 264 can be, for example, an RTOS or a HLOS. The OS 264 can be a specific purpose OS, such as an OS specifically designed for an IoT device. The OS 264 can have an application 266 executing on top of the OS 264.

The application 266 can include a UI, such as a GUI, a button interface (real or virtual buttons), etc. In some examples, the UI of the application 266 can be output on one or more of the K number of registered host devices 258, particularly in situations where the end-user device 250 is an IoT device.

The application 266 can include a provisioning module 268 (e.g., a software module) that can communicate with a theft detector 270. The theft detector 270 can be implemented as firmware (e.g., a discrete IC chip) or a software application with privileged access (e.g., root access) to the features of the end-user device 250. The theft detector 270 can include a theft detector API 272 that can be leveraged by other modules (including the application 266) to further assist in detecting theft.

Figures 7, 8:
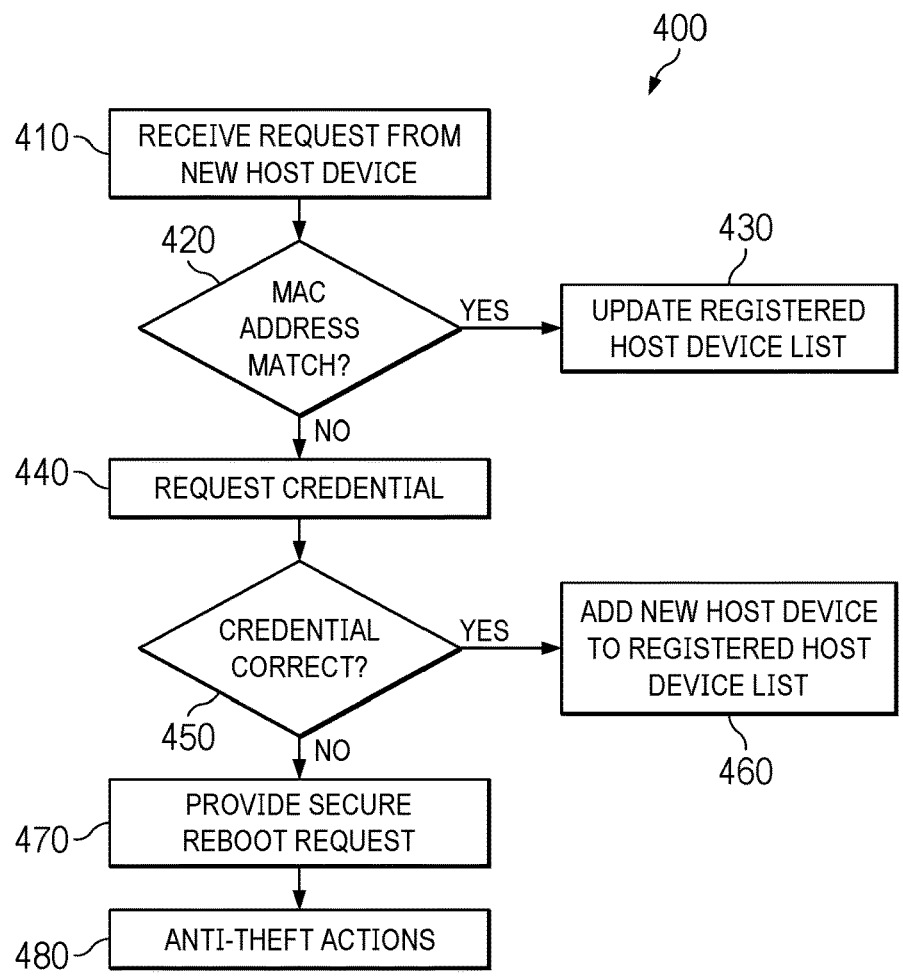
FIG. 7 illustrates an example of a registered host device list.
FIG. 8 illustrates a flowchart of an example method for detecting a theft of an end-user device.

The provisioning module 268 can provide a registered host device list (a list of registered host devices) to the theft detector 270. The registered host device list can be, for example, a list of host devices that have been paired with the end-user device 250. The registered host device list can include identifiers for each of the K number of registered host devices 258. The registered host device list can be encrypted and can be stored in a non-volatile portion of the memory 252 and maintained by the theft detector 270. FIG. 7 illustrates an example of a registered host device list 300 that can be stored by the theft detector 270. The registered host device list 300 can include up to a predetermined number (e.g., five) of host devices that have been registered (paired) with the end-user device 250. Each host device in the registered host device list 300 can have a hostname, a network address (e.g., a randomly assigned address), a MAC address, and a location (provided by the location monitor 263). The network address can be, for example, a public mesh network address/ID, such as a Bluetooth address/ID, a ZigBee address/ID, etc. Additionally, the registered host device list 300 can include (or be linked to) a credential, which can be, a passcode/password and (in some examples) a username.

Referring back to FIG. 6, the application 266 can include a communication module 274 that can also communicate with the theft detector 270 (e.g., via the theft detector API 272). The communication module 274 can provide information characterizing a request for pairing an unregistered (new) host device with the end-user device 250. The unregistered host device 276 can have a (mesh) network address that is not in the registered host device list 300. The request can include a hostname, a network address, a MAC address and a location associated with the unregistered host device 276. The theft detector 270 can compare the MAC address of the unregistered host device 276 with the MAC addresses of each host device in the registered host device list 300. If the MAC address of the unregistered host device 276 matches a MAC address of a host device in the registered host device list 300, the theft detector 270 can update the registered host device list 300 to include the unregistered host device. That is, the theft detector 270 can overwrite the hostname (if changed), the network address and the location of the previous host device with the identifiers associated with the unregistered host device 276. Such an update may be needed, for example, in situations where the network address of a registered host device 258 has changed (e.g., due to dynamic addressing). Moreover, in this manner, no user-intervention is needed in response to a change of a network address.

In situations where the theft detector 270 does not find a match of the MAC address of the unregistered host device 276 with a MAC address in the registered host device list 300, the theft detector 270 can trigger a detected (possible) theft condition. Upon detecting the theft condition, the theft detector 270 can provide a secure reboot request to the boot loader 262 requesting execution of a secure reboot of the end-user device 250.

Additionally or alternatively, the theft detector 270 can include a self-timed loop that can continuously monitor activity of the end-user device 250 to detect theft. For example, the theft detector 270 can periodically (or asynchronously) query the location monitor 263 for a current location of the end-user device 250. The current location (latitude and longitude coordinates) can be compared to the coordinates of each registered host device in the registered host device list 300. In the event that the current location of the end-user device 250 exceeds a predetermined threshold, the theft detector 270 can actuate the theft condition and can provide a reboot request to the boot loader 262 to execute the secure reboot of the end-user device 250.

Upon receipt of such a request to execute the secure reboot, the boot loader 262 can access a secure reboot module (SRM) 278 and execute a secure reboot (e.g., reset) of the end-user device 250 based on commands stored therein. The secure reboot module 278 can be stored in a portion of the ROM of the end-user device 250. In some examples, the secure reboot module 278 can be embedded in an IC chip integrated with the theft detector 270. In other examples, the secure reboot module 278 can be stored separate from the theft detector 270, such as in a stand-alone IC chip and/or in a ROM associated with the boot loader 262. The theft detector 270 can control the operations of the secure reboot. Such operations can include an authentication procedure and/or anti-theft actions.

During execution of the authentication procedure, the theft detector 270 can send a secure message to each of the K number of registered mobile devices 258 (or some subset thereof) requesting that the unregistered (new) host device 276 be added to the registered host device list 300. In some examples, the secure message can be sent to the K number of registered mobile devices 258 directly via the meshed network protocol (e.g., a direct wireless link). Additionally or alternatively, in some examples, the theft detector 270 can cause a client application executing on the unregistered mobile device 276 to send a message via the Internet 260 to the K number of registered mobile devices 258 (or some subset thereof). The secure message can identify the (new) unregistered host device 276 by a hostname or other identifier.

In response to receipt of the secure message, each of the K number of registered mobile devices 258 (or some subset thereof) can prompt a user for the credentials. If the user of one or more of the K number of registered mobile devices 258 provides the credentials, a secure authorization message is returned to the theft detector 270 of the end-user device 250. In response to the secure authorization message, the unregistered mobile device 276 can be added to the registered host device list 300. Moreover, the theft detector 270 can cause the boot loader 262 to reboot the end-user device 250 and operate in a standard mode (loading the OS 264).

In situations where the credentials are either not entered at one or more of the K number of registered mobile devices 258 in a predetermined time (e.g. 5-10 minutes) or are entered correctly (e.g., wrong username or password), the secure reboot can execute the anti-theft actions.

The anti-theft actions can include an attempt to back-up the data of the end-user device 250 (the contents of at least a portion of the memory 252). To back-up the data of the end-user device 250, the theft detector 270 can attempt to contact a back-up server 280 (e.g., a cloud server) operating on the Internet 260. In some examples, the theft detector 270 can attempt to securely transmit the data through the unregistered mobile device 276 to the back-up server 280 via the Internet 260.

Furthermore, the anti-theft actions of the secure reboot can include erasing (wiping) the contents of the memory 252 and/or a service subscription of the end-user device 250 to prevent unauthorized access to secure data. Additionally, the anti-theft actions of the secure reboot can write a theft tag 282 to a non-volatile portion of the memory 252, which theft tag 282 indicates that the end-user device 250 has been stolen. Presence of the theft tag 282 can prevent the application 266 from providing services (e.g., IoT services) to a client application executing on the unregistered host device.

Upon subsequent rebooting (e.g., resetting) of the end-user device 250, the boot loader 262 can examine the theft tag 282, thereby causing the end-user device 250 to execute a secure reboot, wherein some (or all) of the anti-theft actions can be repeated. In this manner, upon execution of the secure reboot, an unauthorized user (e.g., a thief) is prevented from accessing sensitive data that may be stored in the end-user device 250. Additionally, the unauthorized user is also prevented from re-using the end-user device 250, thereby reducing the incentive to steal the end-user device 250.

In view of the foregoing structural and functional features described above, example methods will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 8 can be implemented as instructions stored in a non-transitory machine-readable medium. The instructions can be accessed by a processing resource (e.g., one or more processor cores) and executed to perform the methods disclosed herein.

FIG. 8 illustrates a flowchart of an example method 400 for detecting a theft of an end-user device, such as the end-user device 52 of FIG. 1, the end-user device 150 of FIG. 4 and/or the end-user device 250 of FIG. 6. The method 400 can be implemented by a theft detector (e.g., the theft detector 72 of FIG. 1, the theft detector 170 of FIG. 4 and/or the theft detector 270 of FIG. 6).

At 410, the theft detector can receive a request for communication (e.g., a request for pairing) from a new host device. At 420, the theft detector can determine whether the MAC address of the new host device matches a MAC address stored in a list of registered host devices. If the determination at 420 is positive (e.g., YES), the method proceeds to 430. If the determination is negative (e.g., NO), the method proceeds to 440. At 430, the registered host device list is updated to include identifiers of the new host device.

At 440, a credential (e.g., a passcode/password and username) can be requested by the theft detector. In some examples, the theft detector can cause the new host device to prompt the user for the credential. In other examples, the theft detector can request the credential locally (e.g., via a UI). In yet other examples, the theft detector can contact one or more registered host devices in the registered host device list to request the credential. At 450, the theft detector can make a determination as to whether the credential has been correctly entered. If the determination at 450 is positive (e.g., YES), the method 400 can proceed to 460. If the determination at 450 is negative (e.g., NO), the method 400 can proceed to 470. At 460, the theft detector can add the new host device to the registered host device list.

At 470, the theft detector can provide a secure reboot request to a boot loader to execute a secure reboot of the end-user device. At 480, the theft detector can execute anti-theft actions upon execution of the secure reboot of the end-user device. The anti-theft actions can include, but are not limited to, backing up the data of the end-user device, notifying one or more entities of a possible theft, wiping (erasing) the contents of the end-user device and writing a theft tag to prevent further use of the end-user device.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method comprising:
   receiving, by a first device, a request for communication with a second device;
   in response to receiving the request for communication with the second device, requesting an authentication credential;
   receiving the authentication credential;
   in response to receiving the authentication credential, registering the second device to a registered device list, the second device having an associated first IP address and first MAC address;
   monitoring an IP address of the second device;
   in response to the monitored IP address of the second device changing from the first IP address to a second IP address, determining whether a second MAC address associated with the second IP address matches the first MAC address;
   in response to the second MAC address matching the first MAC address, updating the registered device list to associate the second device with the second IP address; and
   in response to the second MAC address not matching the first MAC address, requesting the authentication credential.

2. A method comprising:
   adding, by a first device, an identifier of a second device to a registered device list of the first device;
   receiving, by the first device, a request for communication with a third device;
   in response to the request for communication with the third device, the first device sending a first message to the second device to prompt authentication of the third device, including receiving a credential;
   receiving a second message from the second device, the second message indicating receipt of the credential;
   in response to the second message, adding an identifier of the third device to the registered device list;
   receiving, by the first device, a request for communication with a fourth device;
   in response to the request for communication with the fourth device, the first device sending a third message to the second device to prompt authentication of the fourth device, including receiving the credential; and
   in response to a failure to receive a fourth message from the second device indicating receipt of the credential, requesting a secure reboot of the first device.

3. The method of claim 2, further comprising:
   in response to the failure to receive the fourth message from the second device indicating receipt of the credential, taking an anti-theft action including one or more of: attempting to back up data of the first device to a back-up device, erasing data of the first device, erasing a service subscription of the first device, writing a theft tag to a non-volatile memory of the first device, blocking operation of an application of the first device, or notifying a contact.

4. The method of claim 3, wherein the anti-theft action includes blocking operation of the application and blocking a request for user data.

5. The method of claim 4, wherein the user data includes one or more of: a username, a password, or biometric data.

6. The method of claim 3, wherein the anti-theft action includes notifying the contact by sending a fifth message that includes a location of the first device.

7. The method of claim 6, wherein the fifth message includes a request to block a service for the first device.

8. The method of claim 2, further comprising, in response to the request for communication with the third device, the first device sending a plurality of messages that include the first message to a plurality of devices that include the second device, wherein each of the plurality of messages prompts authentication of the third device, including receiving the credential.

9. The method of claim 8, further comprising:
   determining when none of the plurality of devices are detectable over a network; and
   in response to none of the plurality of devices being detectable over the network, requesting a secure reboot of the first device.

10. A system comprising:
    a processing unit; and
    a theft detector coupled to the processing unit, wherein the theft detector is configured to:
    store a registered host device list;
    in response to a request for communication with a first host device, determine whether an identifier of the first host device is in the registered host device list;
    in response to the identifier of the first host device not being in the registered host device list, request an authentication credential;
    receive the authentication credential;
    in response to receiving of the authentication credential, add an identifier of the first host device to the registered host device list;
    monitor an IP address of the first host device;
    in response to the monitored IP address of the first host device changing from a first IP address to a second IP address, determining whether a first MAC address associated with the first IP address matches a second MAC address associated with the second IP address;

in response to the second MAC address matching the first MAC address, update the registered host device list to associate the first host device with the second IP address; and in response to the second MAC address not matching the first MAC address, request the authentication credential.

11. A system comprising:
a processing unit;
a theft detector coupled to the processing unit; and
a boot loader coupled to the theft detector, wherein the theft detector is configured to:
store a registered host device list;
in response to a request for communication with a first host device, determine whether an identifier of the first host device is in the registered host device list;
in response to the identifier of the first host device not being in the registered host device list, send a first message to a second host device having an identifier in the registered host device list, the first message to prompt authentication of the first host device, including receiving a credential; and
in response to a second message from the second host device that indicates receipt of the credential, add an identifier of the first host device to the registered host device list;
in response to a request for communication with a third host device, determine whether an identifier of the third host device is in the registered host device list;
in response to the identifier of the third host device not being in the registered host device list, send a third message to the second host device, the third message to prompt authentication of the third host device, including receiving the credential; and
in response to a failure to receive a fourth message from the second host device indicating receipt of the credential, request the boot loader to perform a secure reboot of the system.

12. The system of claim 11, wherein the theft detector is configured to, in response to the failure to receive the fourth message from the second host device indicating receipt of the credential, cause the system to take an anti-theft action including one or more of: attempting to back up data to a back-up device, erasing data, erasing a service subscription, writing a theft tag to a non-volatile memory, blocking operation of an application, or notifying a contact.

13. The system of claim 12, wherein the anti-theft action includes blocking operation of the application and blocking a request for user data.

14. The system of claim 13, wherein the user data includes one or more of: a username, a password, or biometric data.

15. The system of claim 11, further comprising:
a first integrated circuit chip that includes the processing unit;
a second integrated circuit chip that includes the theft detector; and
a third integrated circuit chip that includes the boot loader.

16. The system of claim 11, further comprising:
a first integrated circuit chip that includes the processing unit; and
a second integrated circuit chip that includes the theft detector and the boot loader.

17. A system comprising:
a processing unit;
a non-transitory memory that stores instructions that, when executed, cause the processing unit to:

in response to a request for communication with a first host device, determine whether an identifier of the first host device is in a registered host device list;
in response to the identifier of the first host device not being in the registered host device list, request an authentication credential;
in response to receiving the authentication credential, add an identifier of the first host device to the registered host device list;
monitor an IP address of the first host device;
in response to the monitored IP address of the first host device changing from a first IP address to a second IP address, determining whether a first MAC address associated with the first IP address matches a second MAC address associated with the second IP address;
in response to the second MAC address matching the first MAC address, update the registered host device list to associate the first host device with the second IP address; and
in response to the second MAC address not matching the first MAC address, request the authentication credential.

18. A system comprising:
a processing unit;
a non-transitory memory that stores instructions that, when executed, cause the processing unit to:
in response to a request for communication with a first host device, determine whether an identifier of the first host device is in a registered host device list;
in response to the identifier of the first host device not being in the registered host device list, send a first message to a second host device, the first message to prompt authentication of the first host device, including receiving a credential; and
in response to a second message from the second host device that indicates receipt of the credential, add an identifier of the first host device to the registered host device list;
in response to a request for communication with a third host device, determine whether an identifier of the third host device is in the registered host device list;
in response to the identifier of the third host device not being in the registered host device list, send a third message to the second host device to prompt authentication of the third host device, including receiving the credential; and
in response to a failure to receive a fourth message from the second host device that indicates receipt of the credential, perform a secure reboot of the system.

19. The system of claim 18, wherein instructions cause the processing unit to, in response to the failure to receive the fourth message from the second host device that indicates receipt of the credential, take an anti-theft action including one or more of: attempting to back up data, erasing data, erasing a service subscription, writing a theft tag to a non-volatile memory, blocking operation of an application, or notifying a contact.

20. The system of claim 18, wherein the instructions cause the processing unit to, in response to the request for communication with the first host device, send a plurality of messages that includes the first message to a plurality of devices that include the second host device, each of the plurality of messages to prompt authentication of the first host device, including receiving the credential.

21. The method of claim 1, wherein, when the second MAC address does not match the first MAC address, in response to failure to receive the authentication credential, backing up the first device through the second device.

\* \* \* \* \*